(12) United States Patent
Latini

(10) Patent No.: US 7,862,726 B2
(45) Date of Patent: Jan. 4, 2011

(54) METHOD FOR REGENERATING IONIC EXCHANGE RESINS USED FOR SOFTENING WATER AND DEVICE FOR SOFTENING WATER

(75) Inventor: Albano Latini, Piedicolle (IT)

(73) Assignee: M.I.R. snc di Biscarini S. & Caiello G., Fratta Todina (IT)

( * ) Notice: Subject to any disclaimer, the term of this patent is extended or adjusted under 35 U.S.C. 154(b) by 634 days.

(21) Appl. No.: 11/915,448

(22) PCT Filed: Feb. 14, 2006

(86) PCT No.: PCT/IT2006/000073

§ 371 (c)(1),
(2), (4) Date: Nov. 26, 2007

(87) PCT Pub. No.: WO2006/126223

PCT Pub. Date: Nov. 30, 2006

(65) Prior Publication Data

US 2009/0277842 A1 Nov. 12, 2009

(30) Foreign Application Priority Data

May 26, 2005 (IT) .......................... RM2005A0264

(51) Int. Cl.
*B01J 49/00* (2006.01)
(52) U.S. Cl. .................. 210/670; 210/264; 210/269
(58) Field of Classification Search ................. 210/670, 210/264, 269
See application file for complete search history.

(56) References Cited

U.S. PATENT DOCUMENTS 4,181,605 A * 1/1980 Braswell ..................... 210/673

OTHER PUBLICATIONS

International Search Report of PCT/IT2006/000073 filed Feb. 14, 2006, date of mailing Oct. 2, 2006.

* cited by examiner

*Primary Examiner*—Chester T Barry
(74) *Attorney, Agent, or Firm*—Young & Thompson

(57) ABSTRACT

In a method for regenerating ionic exchange resins (3) used for softening water and a device for softening water, a flow of brine (S) is fed into a housing compartment (2) of the resins (3) at a determined velocity and subsequently a first flow of water alone is fed at a lower velocity than the velocity of the flow of brine (S). The velocities are determined by a ratio between the passage section of a respective throat (8) for feeding the water, and the passage section of a nozzle (10) for feeding the brine (S).

20 Claims, 1 Drawing Sheet

METHOD FOR REGENERATING IONIC EXCHANGE RESINS USED FOR SOFTENING WATER AND DEVICE FOR SOFTENING WATER

TECHNICAL FIELD

The present invention relates to a method for regenerating ionic exchange resins used for softening water and a device for softening such water.

BACKGROUND OF THE INVENTION

As is well known, in water softening ionic exchange resins are used, which attract with their negative ions the positive calcium and magnesium ions suspended in the water. Such resins, normally constituted by small pearls, are housed in a containment compartment provided with a valve for controlling the water. The control valve determines the introduction of a predefined quantity of hard water and the subsequent outflow of the softened water.

In detail, appropriate supply conduits associated to the valve direct the water through the resins in such a way that the resins act by retaining the calcium and magnesium contained in the water.

Normally, the resins must be periodically regenerated to restore the value of sodium originally present thereon and remove the minerals taken from the water, which cause its hardness.

Said step of regenerating the resins consists of the introduction of a brine into the containment compartment.

In particular, to remove any impurities in suspension, the spherical resins are previously washed with counter flowing water. At this point, the brine is supplied by aspiration and fed into the containment compartment in which the resins are housed. The brine is aspirated by effect of the vacuum created by the passage of actuating water appropriately fed by the valve.

At the end of the operation of supplying the brine, a further rinse with water alone is conducted, to remove any residues in suspensions due to the passage of the brine. This wash is generally conducted with equal flow, i.e. feeding water into the containment compartment with a flow having the same direction as the direction of feeding of the water to be softened.

The regeneration method described above is conducted in devices for softening water of two types, commonly known by the terms "up flow" and "down flow". Such devices are differentiated by the direction of flow of the brine which in one case is directed from the lower portion of the containment compartment upwards, and in the other case is directed from the upper portion of the containment compartment downwards.

However, in both these devices, the resin regeneration method has some drawbacks.

A first drawback is linked to the poor efficiency of regeneration of the resins, which in contact with the brine doe not fully exploit the ionic exchange capacity.

Moreover, it should be noted that the resin regeneration steps entail a high consumption of salt and water, used to aspirate the brine and to wash the resins.

Lastly, a further drawback is that the first step of counter-flow washing causes a turbulence within the containment compartment which creates compacted resin blocks with the consequent formation of preferential passages of the water and of the brine. In this situation, the water and the brine are arranged in non uniform fashion among the resins.

SUMMARY OF THE INVENTION

An object of the present invention is to solve the problems noted in the prior art, proposing a method for regenerating ionic exchange resins able to overcome the aforementioned drawbacks.

In particular, an object of the present invention is to provide a method for regenerating ionic exchange resins able to optimise the regenerating capacity of the resins.

An additional object of the present invention is to propose a method for regenerating resins able to reduce water and salt consumption during the regeneration steps.

DESCRIPTION OF THE PREFERRED EMBODIMENT

Figure 1:
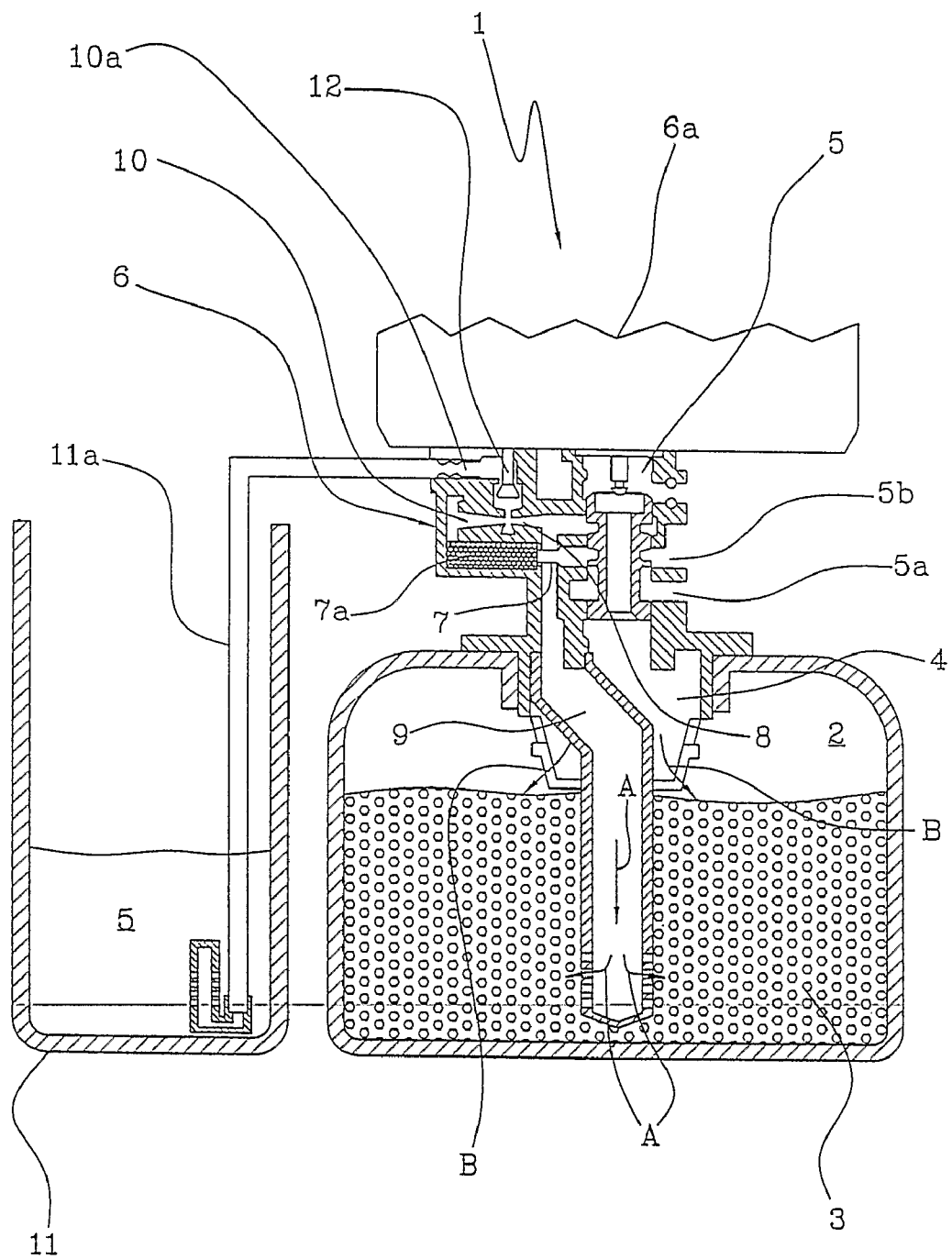
FIG. 1. shows a section view of a device for softening water according to the present invention.

These objects and others besides, which shall become more readily apparent from the description that follows, are substantially achieved by a method for regenerating ionic exchange resins used for softening water, comprising the characteristics expressed in one or more of the claims 1 through 8 and by a device for softening water, in accordance with claims 14 through 20.

Further features and advantages shall become more readily apparent from the detailed description of a preferred, but not exclusive, embodiment of a method for regenerating ionic exchange resins and of a device for softening water, in accordance with the present invention. Said description shall be exposed hereafter with reference to the accompanying FIG. 1, provided solely by way of non limiting indication, which shows a section view of a device for softening water according to the present invention. With reference to the FIGURE, the number 1 globally designates the device for softening water.

It should be noted that FIG. 1 shows an "up flow" device, as briefly described above, having limited capacity to contain water to be softened. FIG. 1 shows a device 1 having section surface area of 324 $cm^2$ (8" bottle).

However, the present invention can be applied to any type of device adapted to soften hard water, and having any containment capacity or diameter.

The device 1 has a compartment 2 for containing a plurality of ionic exchange resins 3, not illustrated in detail because they are known and amply used in the specific technical sector.

Advantageously, the resins 3 have substantially spherical shape and section between 0.5 mm and 1.5 mm.

The device 1 further comprises a conduit 4 for the delivery of water to be softened, to distribute said water in the containment compartment 2.

The conduit 4 is associated to a selection valve 5 positioned on the top of the compartment 2 and adapted to select the passage of water from a respective inlet 5a towards the conduit 4, and from the conduit 4 towards a respective outlet 5b.

In particular, the valve 5 is actuated by a known actuator 6a, to close and open the aforementioned inlet 5a and the outlet 5b.

Next to the valve 5 develops also an injector member 6 associated to the compartment 2 and to the valve 5 itself, to deliver a flow of brine S and a flow of motive water into the containment compartment 2.

It should be specified that the remainder of the present description shall make reference to an injector member 6 of the type shown in FIG. 1 and commonly used in devices 1 with small capacities. However, the present invention may be applied to any type of device 1 regardless of the capacity of that device and of the structure of the injector member 6.

In particular, the injector member 6 is constituted by a first portion 7 for the entry of the motive water, next to the valve 5 which enables the passage of the water from the inlet 5a to the first portion 7. The first portion 7 advantageously has a cylindrical filter 7a to retain any impurities present in the motive water.

Following the path of the motive water flowing in from the first portion 7, it should be noted that downstream of the first portion 7 develops a nozzle 10 for the passage of the motive water, constituted by a Venturi tube. Additionally, downstream of the nozzle 10 develops a throat 8 and subsequently a second portion 9 for the entrance of the brine and of the motive water inside the compartment 2.

The second portion 9 is constituted by a tube extending inside the resins 3 and having a respective passage opening positioned at a lower area of the compartment 2.

The injector member 6 also has a passage 10a for the brine S in fluid communication with a container 11 of the brine. In particular, the container 11 of the brine S is next to the compartment 2 and it has a conduit associated to the passage 10a.

It should be specified that the flow of brine to be introduced into the compartment 2 has a volume equal to ⅓ the volume occupied by the resins 3.

It should also specified that, in the case of an "up flow" device of the type illustrated by way of example in FIG. 1, a brine S is used constituted by a solution obtained with 110 gr of salt for every litre of resin. Alternatively, in the case of a "down flow" device, a brine S is used constituted by a solution obtained with a quantity of salt ranging between 150 gr and 165 gr for every litre of resin.

As shown in the accompanying FIGURE, the passage 10a is constituted by a conduit that connects the conduit 11a for the passage of the brine S with the throat 8 and with the nozzle 10.

The device 1 also has a movable shutter 12 to occlude the passage 10a during the water softening operations.

Advantageously, the ratio between the passage section of the throat 8 and the passage section of the nozzle 10 is greater than 2, preferably greater than 2.2.

Yet more preferably the Applicant has noted considerable advantages using a ratio between the passage section of the throat 8 and passage section of the nozzle 10 between 2 and 3.

Advantageously, said dimensional ratio is obtained using a throat 8 for the passage of the motive water having a section between 1.30 mm and 4.30 mm; and a nozzle 10 having a brine passage section between 0.5 mm and 1.95 mm.

Additionally, it should be noted that in the present exemplifying drawing the throat 8 and the nozzle 10 are consecutive in order to have a same longitudinal development. However, said throat 8 and nozzle 10 can be arranged perpendicularly to each other, in such a way as to have different longitudinal development. This configuration is advantageously used in the injector members 6 of devices 1 having very high capacities. In accordance with the method of the invention, when the resins 3 need to be regenerated, a flow of brine S is fed along a respective first direction A in the housing compartment 2 of the resins 3.

In particular, the motive water is delivered in the first portion 7 of a water line associated to the inlet 5a, at a determined pressure of between 2 and 3 bar. Advantageously, the inlet 5a can be provided with a known pressure regulator, adapted to control the pressure of the water flowing into the device 1.

In this way, the motive water passes through the filter 7a to flow into the nozzle 10 and into the throat 8 arranged as a Venturi tube. By effect of the passage of the water in the nozzle 10, a vacuum is created inside the passage 10 with the consequent aspiration of the brine S contained in the respective container 11.

In this way, the flow of brine S and the motive water are fed simultaneously into the containment compartment 2 through the second portion 9. It should be noted that the brine S and the motive water are introduced through the resins 3 at a lower area of the compartment 2.

Advantageously, through the time of aspiration, the velocity of the flow of brine S (brine plus motive water) through the resins 3 is between 1.90 ml/min/cm$^2$ and 2.40 ml/min/cm$^2$.

After the brine aspiration step, the resins 3 are fed with a first flow of water alone, passing through the second portion 9. In this case as well, the first flow of water is introduced through the resins 3 at the lower area of the compartment 2.

Advantageously, the first flow constituted only by the motive water used for aspiration is fed at a velocity through the resins 3 of between 0.80 ml/min/cm$^2$ and 1.25 ml/min/cm$^2$.

It should be noted that the first flow of water is fed at a lower speed than the flow of brine S. In this way, during the aspiration of the brine S the resins 3 positioned superiorly are raised whilst the resins 3 positioned inferiorly are completely regenerated. The subsequent feeding of the first flow of water at a lower speed than that of the brine S enables to re-compact the previously raised resins 3 and regenerate them in optimal fashion using the volume of brine S that in this step is moved from the lower portion to the upper portion of the compartment 2.

At the end of the feeding of the first flow, a second flow of water is delivered in the housing compartment 2. The second flow is fed along the first direction A with greater speed than the first flow, to wash in counter-flow fashion the previously regenerated resins.

In this situation, it should be recalled that, as described above, known methods consist of an initial counter-washing step and subsequent step of feeding the brine. Instead, in the method of the present invention, said counter-flow washing step is carried out after the delivery of the flow of brine. Advantageously, a more efficient washing of any brine residues present in the compartment is obtained.

At the end of the feeding of the second flow, a third flow of water is delivered into the housing compartment 2. The third flow is fed in equal flow mode, i.e. along a second direction B opposite to the first and corresponding to the direction of flow of service water. In this situation, the third flow is fed through the delivery conduit 4 to rinse the resins 3 and eliminate any impurities in suspension.

Advantageously, a table is provided below with some constructive examples of the device described above and related flow rates of the delivered fluids.

In particular, the following table indicates the sections of nozzle 10 and throat 8 which determine the flow rate of motive water and brine. It also indicates the coefficient of section between throat and nozzle based on the various dimensions normally used in the containment compartment 2 of the resins 3.

| DIMENSIONS resin containment compartment | THROAT AND NOZZLE SECTION (mm) | TOTAL FLOW RATE (ml/min) | FLOW RATES per cm² | COEFFICIENT section between throat and nozzle |
|---|---|---|---|---|
| Cm² 324 21 lt of resin UP FLOW | Nozzle: 0.55 Throat: 1.40 | Motive mater 300 Total water 720 | Brine 2.22 Washing 0.92 | Throat section 2.54 relative to the nozzle |
| Cm² 1295 150 lt of resin UP FLOW | Nozzle: 1.00 Throat: 2.70 | Motive mater 1120 Total water 2600 | Brine 2.00 Washing 0.86 | Throat section 2.70 relative to the nozzle |
| Cm² 2917 300 lt of resin DOWN FLOW | Nozzle: 1.90 Throat: 4.20 | Motive mater 2800 Total water 6100 | Brine 2.09 Washing 0.95 | Throat section 2.21 relative to the nozzle |

As can be noted, this coefficient, measured using a test pressure of 2 bar, is always greater than 2. Preferably, the section of the throat 8 is always greater than the section of the nozzle 10 by at least 220%.

The invention achieves important advantages.

First of all, using a device 1 having the aforementioned dimensional ratios between throat 8 and nozzle 10 it is possible to obtain a flow of brine having a determined speed and a subsequent first flow of motive water at a lower velocity than that of the brine.

As described above, the velocity variation of the two flows enables to determine a partial separation of two superposed areas of the resins 3. In this way, the resins are regenerated more effectively.

Consequently, optimising ionic exchange processes, savings are also achieved in the amount of motive water used, as well as of the salt used for the brine S.

It should be noted that, for equal dimensions, the device 1 of the present invention uses a quantity of total water and brine equal to about one third the quantity of total water and brine used in known devices. Taking as an example the device 1 with surface area of 324 cm², the following are used: 300 ml of motive water; 720 ml of total water; and a brine flow rate, in cm², of 2.22 ml/min. As is well known, standard devices having surface area of 324 cm² use, for the regeneration steps: 1160 ml of motive water; 2040 ml of total water; and a brine flow rate of 6.3 ml/min.

In this situation, note that the quantity of water and brine used in the device 1 of the present invention is far smaller than that used in the standard processes of known devices.

An additional advantage is given by the capability of uniformly conveying the brine S between the resins 3. This advantage is given by the fact that the resins 3 are washed with water only after the brine S is fed.

in this way, the brine impacts the resins 3 before any compacted resin blocks are formed.

The invention claimed is:

1. A method for regenerating ionic exchange resins used for softening water, comprising the step of feeding a flow of brine (S) along a respective first direction (A) in a housing compartment (2) of said resins (3); characterised in that said step of feeding said flow of brine (S) comprises the sub-steps of delivering the flow of brine (S) at a calculated velocity on the section surface of each resin (3) of between 1.90 ml/min/cm² and 2.40 ml/min/cm² and subsequently feeding a first flow of water at a velocity calculated on the section surface of each resin (3) of between 0.80 ml/min/cm² and 1.25 ml/min/cm².

2. Method as claimed in claim 1, characterised in that it further comprises the step of delivering a second flow of water in said housing compartment (2) of the resins (3) along the first direction (A), said step of delivering the second flow being subsequent to the step of feeding the first flow of water.

3. Method as claimed in claim 2, characterised in that the water is fed at a pressure of between 2 and 3 bar.

4. Method as claimed in claim 2, characterised in that said flow of brine (S) has a volume equal to ⅓ of the volume occupied by the resin (3).

5. Method as claimed in claim 2, characterised in that it further comprises the step of delivering a third flow of water in the housing compartment (2) of the resins (3) along a second direction (B) opposite to the first direction (A), said step of delivering the third flow being subsequent to the step of delivering the second flow of water.

6. Method as claimed in claim 5, characterised in that the water is fed at a pressure of between 2 and 3 bar.

7. Method as claimed in claim 5, characterised in that said flow of brine (S) has a volume equal to ⅓ of the volume occupied by the resin (3).

8. Method as claimed in claim 1, characterised in that the water is fed at a pressure of between 2 and 3 bar.

9. Method as claimed in claim 8, characterised in that the pressure of the water is determined by a pressure-regulator.

10. Method as claimed in claim 8, characterised in that said flow of brine (S) is aspirated through a passage (10) and in that said motive water is made to pass through a nozzle (10) and a throat (8); said throat (8) and nozzle (10) having a ration of passage section between 2 and 3.

11. Method as claimed in claim 10, characterised in that the section of the throat (8) is always greater than the section of the nozzle (10) by at least 220%.

12. Method as claimed in claim 8, characterised in that said flow of brine (S) has a volume equal to ⅓ of the volume occupied by the resin (3).

13. Method as claimed in claim 1, characterised in that said flow of brine (S) has a volume equal to ⅓ of the volume occupied by the resin (3).

14. Device for softening water, comprising:
   a compartment (2) for containing a plurality of ionic exchange resins (3);
   a conduit (4) for delivering water to be softened to distribute said water in said containment compartment (2);
   a selection valve (5) associated to said conduit (4) to allow the passage of said water from an inlet (5*a*) towards said compartment (2) and from said compartment (2) towards an outlet (5*b*) positioned next to said inlet (5*a*);
   a container (11) of a brine (S), positioned next to said compartment (2) and in fluid communication therewith; and an injector member (6) associated to said container (11) and to said valve (5) to deliver said brine (S) and a flow of motive water in the containment compartment (2) of the resins (3), said injector member (6) having a nozzle (10) and a throat (8) for the passage of the motive water; characterised in that the ratio between a passage section of the throat (8) and a passage section of the nozzle (10) is greater than 2, preferably greater than 2.2.

15. Device as claimed in claim 14, characterised in that said ratio between the passage sections is between 2 and 3.

16. Device as claimed in claim 14, characterised in that said nozzle (10) and throat (8) comprise a Venturi tube having passage section between 1.30 mm and 4.30 mm.

17. Device as claimed in claim 16, characterised in that it comprises a passage (10) of the brine (S) aspirated by effect of the vacuum generated by the passage of the motive water in the Venturi; said passage having section between 0.5 mm and 1.95 mm.

18. Device as claimed in claim 14, characterised in that said resins (3) have substantially spherical shape and section between 0.5 mm and 1.5 mm.

19. Device as claimed in claim 14, characterised in that said brine (S) comprises a solution obtained with 110 g of salt for each liter of resin (3).

20. Device as claimed in claim 14, characterised in that said brine (S) comprises a solution obtained with a quantity of salt between 150 g and 165 g for each liter of resin (3).

* * * * *